(12) United States Patent
Lugani

(10) Patent No.: US 12,716,753 B2
(45) Date of Patent: Aug. 25, 2026

(54) INDUCTIVE ANGLE SENSOR AND TORQUE SENSOR

(71) Applicant: Melexis Technologies SA, Bevaix (CH)

(72) Inventor: Lorenzo Lugani, Bevaix (CH)

(73) Assignee: Melexis Technologies SA, Bevaix (CH)

( * ) Notice: Subject to any disclaimer, the term of this patent is extended or adjusted under 35 U.S.C. 154(b) by 71 days.

(21) Appl. No.: 18/607,913

(22) Filed: Mar. 18, 2024

(65) Prior Publication Data

US 2024/0318984 A1 Sep. 26, 2024

(30) Foreign Application Priority Data

Mar. 24, 2023 (EP) .................................... 23164191

(51) Int. Cl.
*G01D 5/20* (2006.01)
*H01F 27/36* (2006.01)
*H01F 38/14* (2006.01)

(52) U.S. Cl.
CPC ........... *G01D 5/2053* (2013.01); *H01F 27/36* (2013.01); *H01F 38/14* (2013.01)

(58) Field of Classification Search
CPC .................................................... G01D 5/2053
See application file for complete search history.

(56) References Cited

U.S. PATENT DOCUMENTS 6,384,598 B1 * 5/2002 Hobein ................ G01D 5/2046 318/660
7,385,389 B2 * 6/2008 Tahara ................. G01D 5/2086 324/207.17
8,453,518 B2 * 6/2013 Diekmann .............. G01L 3/105 73/862.08
11,047,710 B2 * 6/2021 Shao ...................... H03K 17/97
2010/0319467 A1 12/2010 Diekmann et al.
2021/0063206 A1 3/2021 Ausserlechner
2022/0057281 A1 2/2022 Ausserlechner
2023/0089358 A1 * 3/2023 Chen .................. B62D 15/0215 310/68 B
2024/0019275 A1 * 1/2024 Kuntz .................. G01D 5/2053
2025/0093220 A1 * 3/2025 Hultén .................... G01L 5/221

FOREIGN PATENT DOCUMENTS

DE 102022207287 A1 * 1/2024 ........... G01D 5/2053
EP 3885711 A1 9/2021
WO 2017100515 A1 6/2017
WO 2021250510 A1 12/2021

OTHER PUBLICATIONS

Extended European Search Report from corresponding European Patent Application No. EP23164191.1, Aug. 29, 2023.

* cited by examiner

*Primary Examiner* — Walter L Lindsay, Jr.
*Assistant Examiner* — Milton Gonzalez
(74) *Attorney, Agent, or Firm* — Workman Nydegger

(57) ABSTRACT

An inductive angle sensor includes a transmitter coil and an excitation circuit; a first set of receiver coils has a geometry with a first periodicity N; a first movable coupling element has a periodic geometry with said first periodicity N; a second set of receiver coils has a geometry with a second periodicity M smaller than the first periodicity N; a second movable coupling element having a periodic geometry with said second periodicity M; wherein a ratio N/M of the first periodicity N and the second periodicity M is equal to 1.5. A torque sensor includes an inductive angle sensor and a torque bar. A printed circuit board includes the plurality of coils.

9 Claims, 5 Drawing Sheets ratio R=N/M
Range=360°/LCM(N,M)

| N | M | LCM | Range |
|---|---|---|---|
| 6 | 4 | 12 | 30° = ±15° |
| 9 | 6 | 18 | 20° = ±10° |
| 12 | 8 | 24 | 15° = ±7.5° |
| 15 | 10 | 30 | 12° = ±6° |
| 18 | 12 | 36 | 10° = ±5° |

INDUCTIVE ANGLE SENSOR AND TORQUE SENSOR

FIELD OF THE INVENTION

The present invention relates in general to the field of inductive angle sensors and inductive torque sensors, and more specifically to an inductive angle sensor and an inductive torque sensor of the type comprising a transmitter coil, a first set of receiver coils, a first movable coupling element, a second set of receiver coils, and a second movable coupling element. The present invention is also related to a printed circuit board suitable for use in an inductive angle sensor or inductive torque sensor.

BACKGROUND OF THE INVENTION

Inductive angle sensors are known in the art. They offer the advantage of being able to measure an angular position without making physical contact, thus avoiding problems of mechanical wear, scratches, friction, etc. They typically comprise an excitation coil (also known as "transmitter coil") and multiple detection coils (also known as "receiver coils"). The excitation coil generates an alternating magnetic field, which is coupled to a set of receiver coils depending on an angular position of the coupling element. Signals obtained from the receiver coils are processed in an electronics circuit, and an angular position is determined based on these signals.

The present invention is related to an inductive angle sensor having two sets of receiver coils, and two movable elements, and an electronic circuit for determining an angle between these movable elements. When these coupling elements are connected to a torque bar, the angle between the coupling elements is related to the torque exerted upon the torque bar.

US2010319467(A1) discloses an inductive torque sensor for a motor vehicle, comprising at least one excitation coil, at least one oscillator circuit, a stator circuit board, at least two rotors, and evaluation means.

There is always room for improvements or alternatives.

SUMMARY OF THE INVENTION

It is an object of embodiments of the present invention to provide an inductive angle sensor, and a torque sensor comprising such an angle sensor, and a printed circuit board for use in such an angle sensor.

It is an object of embodiments of the present invention to provide an inductive angle sensor and/or a torque sensor having one or more of the following characteristics: same or improved measurement range, same or improved accuracy (e.g. same or reduced error) as compared to existing solutions having a similar size (e.g. same diameter of coupling elements), and preferably all of these.

It is an object of embodiments of the present invention to provide an inductive angle sensor and/or a torque sensor having smaller dimensions (e.g. smaller diameter of coupling elements) as compared to existing solutions having a similar measurement range and/or a similar accuracy (e.g. similar error).

It is an object of embodiments of the present invention to provide an inductive angle sensor and/or a torque sensor having similar dimensions and similar accuracy as compared with existing solutions but being less complex and/or having a lower cost and/or easier to produce.

It is an object of embodiments of the present invention to provide an inductive sensor and/or torque sensor that is suitable for use in an automotive environment.

It is an object of embodiments of the present invention to provide an inductive sensor and/or torque sensor that is suitable for use in an industrial or robotic environment.

These objectives are accomplished by embodiments of the present invention.

According to a first aspect, the present invention provides an inductive angle sensor, comprising: at least one transmitter coil (e.g. TX) for generating an alternating magnetic field; at least one excitation circuit for generating an alternating signal for energizing said at least one transmitter coil; a first set of receiver coils (e.g. RX1*a*, RX1*b*, RX1*c*), each having a geometry with a first periodicity N; a second set of receiver coils (e.g. Rx2*a*, RX2*b*, RX2*c*), each having a geometry with a second periodicity M smaller than the first periodicity N; an evaluation circuit for evaluating signals obtained from the first and second set of receiver coils; a first movable coupling element (also referred to as "first target") for providing an inductive coupling between the at least one transmitter coil (e.g. TX) and the first set of receiver coils (e.g. RX1*a*, RX1*b*, RX1*c*), the first coupling element having a periodic geometry with said first periodicity N; a second movable coupling element (also referred to as "second target") for providing an inductive coupling between the at least one transmitter coil and the second set of receiver coils (e.g. Rx2*a*, RX2*b*, RX2*c*), the second coupling element having a periodic geometry with said second periodicity M; wherein a ratio N/M of the first periodicity N and the second periodicity M is equal to 1.5.

The inventors surprisingly found that the accuracy of this inductive angle sensor is much better than the accuracy of an inductive angle sensor having substantially the same angular range, but having an integer ratio between the first and second periodicity, because not only the signal-to-noise ratio (SNR) will be better, but especially because the crosstalk will be much lower.

The second coupling element is movable relative to the first coupling element, so as to form an angle between them.

The at least one transmitter coil and the plurality of receiver coils may be implemented on a single substrate (e.g. printed circuit board, PCB) or may be implemented on two separate PCB's.

In an embodiment, the inductive angle sensor comprises only a single transmitter coil, arranged for generating a magnetic field to be received by both the first set of receiver coils and the second set of receiver coils.

In an embodiment, each of the first movable target and the second movable target is made of a metal sheet.

In an embodiment, the inductive angle sensor comprises two transmitter coils, comprising a first transmitter coil for generating a magnetic field to be received by the first set of receiver coils, and a second transmitter coil for generating a magnetic field to be received by the second set of receiver coils.

In an embodiment, the excitation circuit and the evaluation circuit are implemented in an integrated semiconductor device (also referred to as "chip").

The evaluation unit may be configured for determining a first angular value based on the signals obtained from the first set of receiver coils, and for determining a second angular value based on the signals obtained from the second set of receiver coils, and optionally also for determining an angular difference between the first and second angular value. The evaluation unit may also be configured for determining a torque value, based on the angular difference.

The integrated semiconductor device may output one or more of the first angular value, the second angular value, the angular difference (if determined), and the torque value (if determined).

The inductive angle sensor may comprise a single transmitter coil which is commonly used for the first and second receiver coils. Alternatively, the inductive angle sensor may comprise two transmitter coils, one for the first set of receiver coils, and one for the second set of receiver coils.

In an embodiment, the evaluation circuit is configured for determining a first angular value ($\alpha$1) based on the signals obtained from the first set of receiver coils, and for determining a second angular value ($\alpha$2) based on the signals obtained from the second set of receiver coils, and for determining a difference between the first angular value ($\alpha$1) and the second angular value ($\alpha$2).

In an embodiment, the first periodicity N is equal to 6, and the second periodicity M is 4.

In an embodiment, the first periodicity N is equal to 9, and the second periodicity M is 6.

In an embodiment, the first periodicity N is equal to 12, and the second periodicity M is 8.

In an embodiment, the first periodicity N is equal to 15, and the second periodicity M is 10.

In an embodiment, the first periodicity N is equal to 18, and the second periodicity M is 12.

The combinations with (N=6 or 9 or 12) are particularly useful for use in automotive applications, because in addition to the above-mentioned advantage, they provide a relatively large measurement range: ±15° (for N=6, M=4), ±10° (for N=9, M=6), ±7.5° (for N=12, M=8).

The combination with (N=6 or N=9) is particularly advantageous, because the measurement range not only includes a function range (typically ±5%), but also includes an extra range for functional safety.

In an embodiment, the first set of receiver coils has a two-phase loop structure, and wherein the second set of receiver coils has a two-phase loop structure.

In an embodiment, the first set of receiver coils has a two-phase loop structure, and wherein the second set of receiver coils has a three-phase loop structure.

In an embodiment, the first set of receiver coils has a three-phase loop structure, and wherein the second set of receiver coils has a two-phase loop structure.

In an embodiment, the first set of receiver coils has a three-phase loop structure, and wherein the second set of receiver coils has a three-phase loop structure.

In an embodiment, at least one of the first and second set of receiver coils has a three-phase loop structure; and the at least one transmitter coil, and the first set of receiver coils, and the second set of receiver coils are implemented on a single multi-layer printed circuit board.

It is an advantage of this embodiment that a second harmonic of the signal induced by one set of coils will be seen by the other set of coils as 3.0 times or as 1.33 times the harmonic frequency but is not sensitive to this frequency. The multilayer printed circuit board may also comprise the above-mentioned integrated semiconductor device.

Preferably, the multi-layer PCB is arranged between the first and the second movable coupling element. By doing so, the distance between the coils and the corresponding movable coupling element can be reduced, while the received signals are sufficiently large, and the physical spacing (airgap) between the PCB and the movable elements is sufficiently large to avoiding contact.

In an embodiment, this multilayer PCB is a six-layer PCB. The first set of receiver coils may be implemented mainly on two adjacent layers, and the second set of receiver coils may be implemented mainly on two other adjacent layers, and the two inner layers may be used mainly for shielding purposes, e.g. to prevent or reduce cross-talk.

In an embodiment, the printed circuit board is a four-layer printed circuit board.

It was surprisingly found that a six layer PCB is not required if the ratio between the periodicities is a factor 1.5, and at least one of the first set of receiver coils and the second set of receiver coils is implemented with a three-phase loop structure, despite the fact that the second (and sixth) harmonic of the signal induced in the first set of coils could be experienced as a third (and ninth) harmonic disturbance in the second set of coils (due to the ratio 1.5), because a three-phase loop structure is substantially insensitive to the third and the ninth harmonic.

According to a second aspect, the present invention also provides an inductive torque sensor comprising: a torsion bar; an inductive angle sensor according to the first aspect; wherein the first movable coupling element and the second movable coupling element are connected to the torsion bar. (e.g. at opposite ends of the torsion bar).

The actual torque value may be calculated by the evaluation circuit and may be output by the integrated semiconductor device. Alternatively or additionally, the evaluation circuit may output two angular positions, and/or a difference between them, or the torque value may be calculated outside of the evaluation circuit, e.g. in an electronic control unit (ECU) connected to the integrated semiconductor device.

According to a third aspect, the present invention also provides a printed circuit board (e.g. suitable for use in an Inductive angle sensor according to the first aspect, or an inductive torque sensor according to the second aspect), the printed circuit board comprising: at least one transmitter coil (e.g. TX) for generating an alternating magnetic field; a first set of receiver coils (e.g. RX1*a*, RX1*b*, RX1*c*), each having a geometry with a first periodicity N; a second set of receiver coils (e.g. Rx2*a*, RX2*b*, RX2*c*), each having a geometry with a second periodicity M smaller than the first periodicity N; wherein the printed circuit board comprises only four layers; a ratio N/M of the first periodicity N and the second periodicity M is equal to 1.5.

In an embodiment, the first periodicity N is equal to 6, and the second periodicity M is 4.

In an embodiment, the first periodicity N is equal to 9, and the second periodicity M is 6.

In an embodiment, the first periodicity N is equal to 12, and the second periodicity M is 8.

In an embodiment, the first periodicity N is equal to 15, and the second periodicity M is 10.

In an embodiment, the first periodicity N is equal to 18, and the second periodicity M is 12.

In an embodiment, the printed circuit board further comprises: at least one excitation circuit for generating an alternating signal for energizing said at least one transmitter coil; and an evaluation circuit for evaluating signals obtained from the first and second set of receiver coils.

In an embodiment, the at least one excitation circuit and the evaluation circuit are implemented in a single integrated circuit device, mounted on the printed circuit board.

According to a fourth aspect, the present invention also provides an inductive angle sensor comprising: at least one transmitter coil for generating an alternating magnetic field; at least one excitation circuit for generating an alternating signal for energizing said at least one transmitter coil; a first set of receiver coils, each having a geometry with a first periodicity N; a second set of receiver coils, each having a geometry with a second periodicity M smaller than the first periodicity N; an evaluation circuit for evaluating signals obtained from the first and second set of receiver coils; a first movable coupling element for providing an inductive coupling between the at least one transmitter coil and the first set of receiver coils, the first coupling element having a periodic geometry with said first periodicity N; a second movable coupling element for providing an inductive coupling between the at least one transmitter coil and the second set of receiver coils, the second coupling element having a periodic geometry with said second periodicity M; wherein a ratio N/M of the first periodicity N and the second periodicity M is a non-integer value selected from the group consisting of 4/3, 6/5, 5/2, and 7/2; and wherein the at least one transmitter coil, and the first set of receiver coils, and the second set of receiver coils are implemented on a single four-layer printed circuit board.

Optionally at least one of the first set of receiver coils and the second set of receiver coils has a three-phase loop structure.

It can be shown that an inductive angle sensor having a first and second set of receiver coils with a ratio N/M equal to one of these values, has many of the same properties as an inductive angle sensor with N/M=1.5, in particular regarding the negligible amount of cross-talk. The plurality of coils can therefore be implemented on a four-layer PCB, since the shielding layers are not required. This results in a solution that is easier to produce (as compared to a six-layer PCB), and is thus cheaper.

According to a fifth aspect, the present invention also provides an inductive torque sensor comprising: a torsion bar; an inductive angle sensor according to the fourth aspect; wherein the first movable coupling element and the second movable coupling element are connected to the torsion bar. (e.g. at opposite ends of the torsion bar).

The evaluation circuit may be configured for outputting a signal indicative of the actual torque, e.g. the above-described angular difference, which is typically proportional to the actual torque.

According to a sixth aspect, the present invention also provides a printed circuit board suitable for use in an Inductive angle sensor according to the fourth aspect or in an inductive torque sensor according to the fifth aspect, the printed circuit board comprising: at least one transmitter coil for generating an alternating magnetic field; a first set of receiver coils, each having a geometry with a first periodicity N; a second set of receiver coils, each having a geometry with a second periodicity M smaller than the first periodicity N; wherein the printed circuit board comprises only four layers; and a ratio N/M of the first periodicity N and the second periodicity M is a non-integer value selected from the group consisting of 3/2, 4/3, 6/5, 5/2, and 7/2.

Optionally at least one of the first set of receiver coils and the second set of receiver coils has a three-phase loop structure.

In an embodiment, the first set of receiver coils has a three-phase loop structure and the second set of receiver coils has a two-phase loop structure.

In an embodiment, the first set of receiver coils has a two-phase loop structure and the second set of receiver coils has a three-phase loop structure.

In an embodiment, the first set of receiver coils has a three-phase loop structure and the second set of receiver coils has a three-phase loop structure.

In an embodiment, the ratio is equal to 2.5, N is equal to 15, and M is equal to 6.

In an embodiment, the printed circuit board further comprises: at least one excitation circuit for generating an alternating signal for energizing said at least one transmitter coil; and an evaluation circuit for evaluating signals obtained from the first and second set of receiver coils.

In an embodiment, the at least one excitation circuit and the evaluation circuit are implemented in a single integrated circuit device, mounted on the printed circuit board.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

Figures 1A, 1B, 1C, 1D:
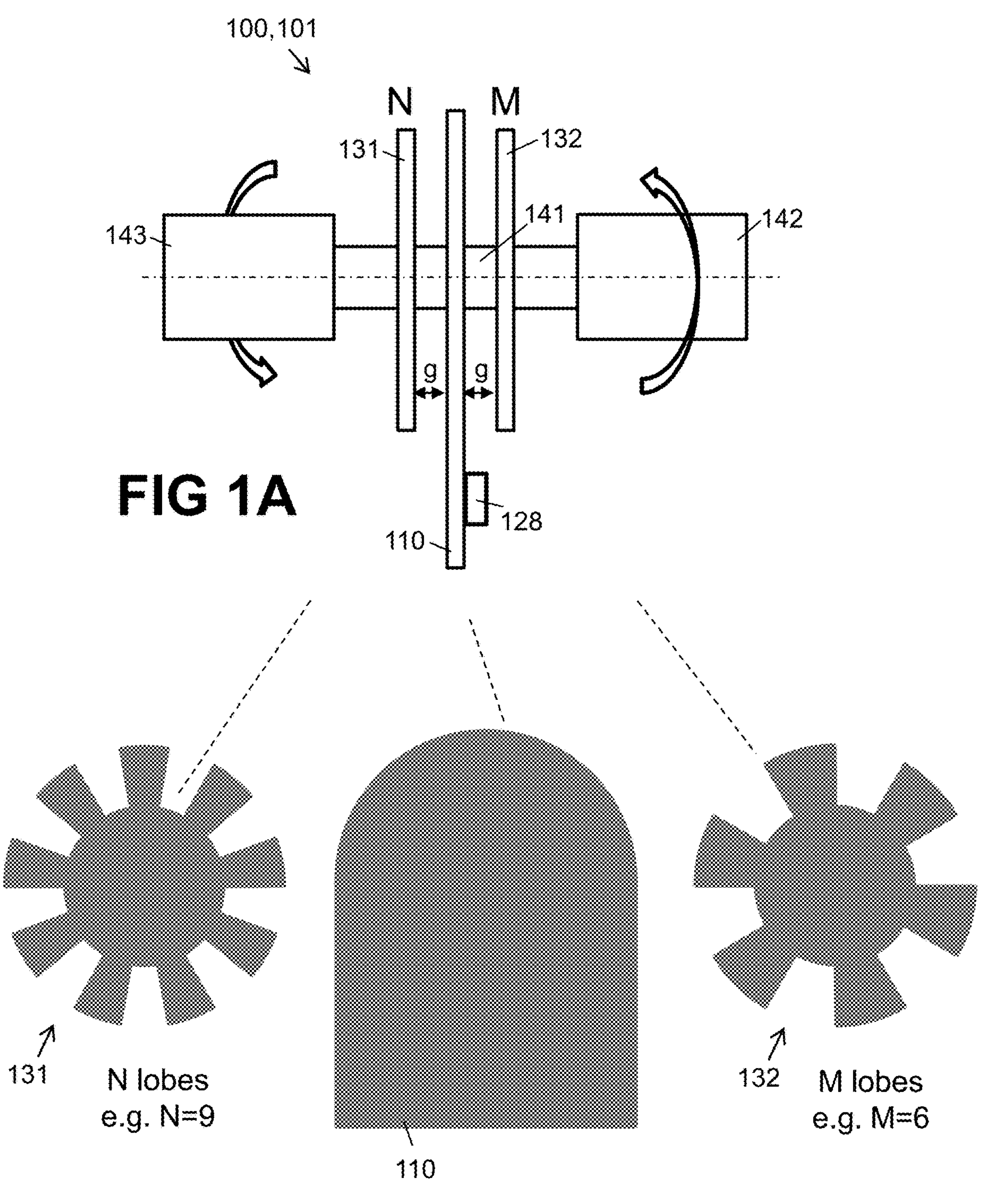
FIG. 1A shows a schematic representation of a torque sensor according to an embodiment of the present invention. It comprises an angle sensor according to an embodiment of the present invention, and a torque bar, mounted to an input shaft portion and an output shaft portion.
FIG. 1B shows an illustrative example of a first coupling element having N lobes (in the example: N=9).
FIG. 1C shows an illustrative example of a printed circuit board comprising a plurality of coils.
FIG. 1D shows an illustrative example of a second coupling element having M lobes (in the example: M=6).

The drawings are only schematic and are non-limiting. In the drawings, the size of some of the elements may be exaggerated and not drawn on scale for illustrative purposes. Any reference signs in the claims shall not be construed as limiting the scope. In the different drawings, the same or like reference signs (e.g. same modulo 100) typically refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "excitation coil" and "transmitter coil" mean the same.

In this document, the terms "receiver coil" and "detection coil" mean the same.

In this document, the terms "coupling element" and "target" and "rotor" mean the same.

In this document, the expression "first coil set" may refer to the first set of receiver coils" with or without at least one transmitter coil, depending on the context.

In this document, the expression "second coil set" may refer to the second set of receiver coils" with or without at least one transmitter coil, depending on the context.

In this document, the "periodicity" of a movable target may refer to the number of lobes.

In this document, a "mechanical angle" of a movable target can be calculated as the "electrical angle" of the movable target divided by its periodicity.

In this document, sqrt( ) means the square root function.

The present invention is related to inductive angle sensors having two sets of receiver coils and having two movable coupling elements, e.g. of a type similar to that described in US2010319467(A1). For ease of the discussion, it will be assumed that the first target has a first periodicity N (e.g. N lobes), and the second target has a second periodicity M (e.g. M lobes), where N and M are integer values. In US2010319467(A1) it is stated that the value of N is an integer multiple of M, and that the preferred ratio of N/M is equal to 2.0. An example is given of an inductive sensor with (N=30, and M=15) having a angle periodicity of 15° and another inductive sensor with (N=18, and M=9) having a angle periodicity of 20°. Such combinations are alleged to yield little measuring errors.

The inventors of the present invention wanted to find an inductive angle sensor having a similar measurement range, without significantly increasing the measurement errors.

They started experimenting, and they surprisingly found, when taking all relevant aspects into account, that an inductive angle sensor of a similar size (e.g. same outer diameter of the targets) but having a ratio N/M equal to 1.5 yields a lower measurement error than a prior-art sensor with (N/M=2) having the same measurement range. This was unexpected. Or stated differently, they found that an inductive angle sensor having the same measurement range and the same measurement error can be implemented with a smaller size or form factor, and thus at a lower cost. This came as a big surprise, especially when considering that the automotive market is a highly competitive market, and that US2010319467(A1) was published already more than 12 years ago.

The principles of the present invention will be explained in more detail below. The above mentioned prior art sensor with N=18 and M=9 (with ratio N/M=2) will be referred to as a "reference sensor".

Referring now to the figures.

FIG. 1A shows a schematic representation of a torque sensor 100, comprising an angle sensor 101 and a torque bar 141. The torque bar 141 may be connected at one end to an input shaft 142, and at its other end to an output shaft 143.

Figure 2A:
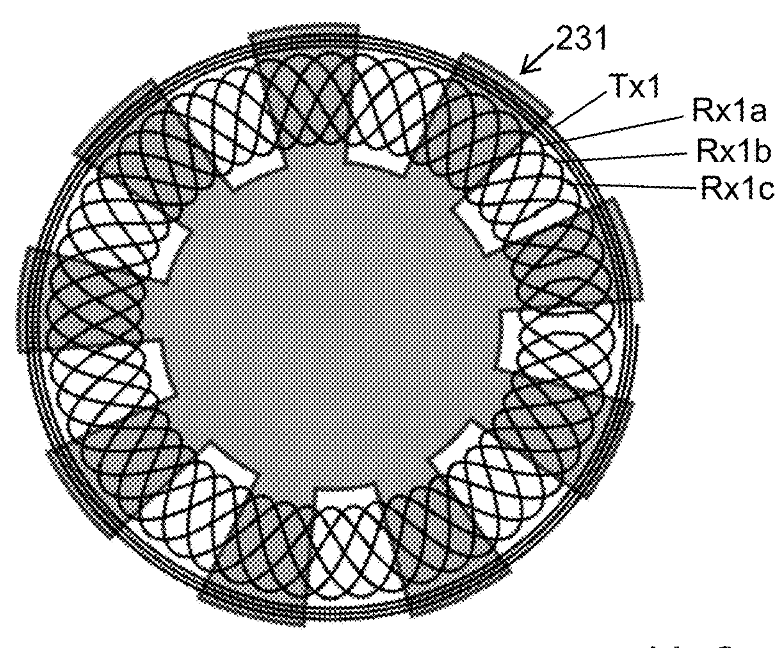
FIG. 2A shows an illustrative example of the first coupling element of FIG. 1B, movably mounted relative to a substrate comprising at least one transmitter coil and a first set of receiver coils. These receiver coils have the same periodicity as the first coupling element (in the example: N=9).
Figure 2B:
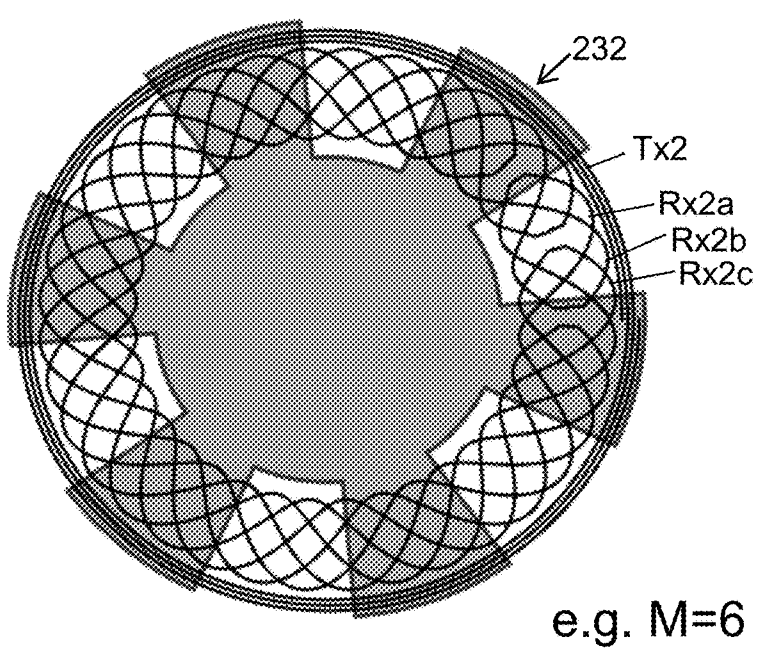
FIG. 2B shows an illustrative example of the second coupling element of FIG. 1D, movably mounted relative to a substrate comprising at least one transmitter coil and a second set of receiver coils. These receiver coils have the same periodicity as the second coupling element (in the example: M=6).

The Angle Sensor 101 Comprises:

at least one transmitter coil (e.g. only one transmitter coil, or two transmitter coils Tx1, Tx2) for generating an alternating magnetic field. The at least one transmitter coil may have a substantially circular shape, e.g. as illustrated in FIG. 2A and FIG. 2B;

at least one excitation circuit 321 (see e.g. FIG. 3) for generating an alternating signal (e.g. a sinusoidal current) for energizing said at least one transmitter coil;

a first set of receiver coils Rx1_a_, Rx1_b_, Rx1_c_, each having a geometry with a first periodicity N, for example two receiver coils, 90° phase shifted relative to each other in case of a two-phase system, or three receiver coils, 120° phase shifted relative to each other in case of a three-phase system;

a second set of receiver coils Rx2_a_, Rx2_b_, Rx2_c_, each having a geometry with a second periodicity M, smaller than the first periodicity N;

an evaluation circuit 320 for evaluating signals obtained from the first and second set of receiver coils;

a first movable coupling element 131 (also referred to as "first target" or "first rotor") for providing an inductive coupling between the at least one transmitter coil and the first set of receiver coils, the first coupling element 131 having a periodic geometry with said first periodicity N. In the example of FIG. 1D, the first coupling element has a shape with nine lobes (N=9), angularly spaced apart by multiples of 360°/9=40°;

a second movable coupling element 132 (also referred to as "second target" or "second rotor") for providing an inductive coupling between the at least one transmitter coil and the second set of receiver coils, the second coupling element 132 having a periodic geometry with said second periodicity M. In the example of FIG. 1B to FIG. 1D, the second coupling element has a shape with six lobes (M=6), angularly spaced apart by multiples of 360°/6=60°;

wherein a ratio of the first periodicity N and the second periodicity M is equal to 1.5.

It is noted that a single transmitter coil is sufficient for exciting both movable targets.

In an embodiment, the transmitter coil has an overall circular shape. Alternatively, the transmitter coil has an overall C-shape.

As suggested by FIG. 1A, the first target 131 is located at a distance "g" from the first set of coils, and the second target 132 is located at a distance "g" from the second set of coils. In preferred embodiments, "g" is a value in the range from 0.1 to 5.0 mm, or a value in the range from 0.5 to 4.0 mm, e.g. a value in the range from 1.0 to 3.0 mm, or a value in the range from 1.5 to 2.5 mm, e.g. equal to about 2.0 mm. The smaller the value "g", the larger the signals obtained from the receiver coils, and thus the larger the signal-to-noise ratio (SNR), but the smaller the mechanical tolerances (i.e. higher requirements) for avoiding mechanical friction.

FIG. 1B shows an illustrative example of a first coupling element having N lobes. In the example shown, N is equal to 9.

Figure 3:
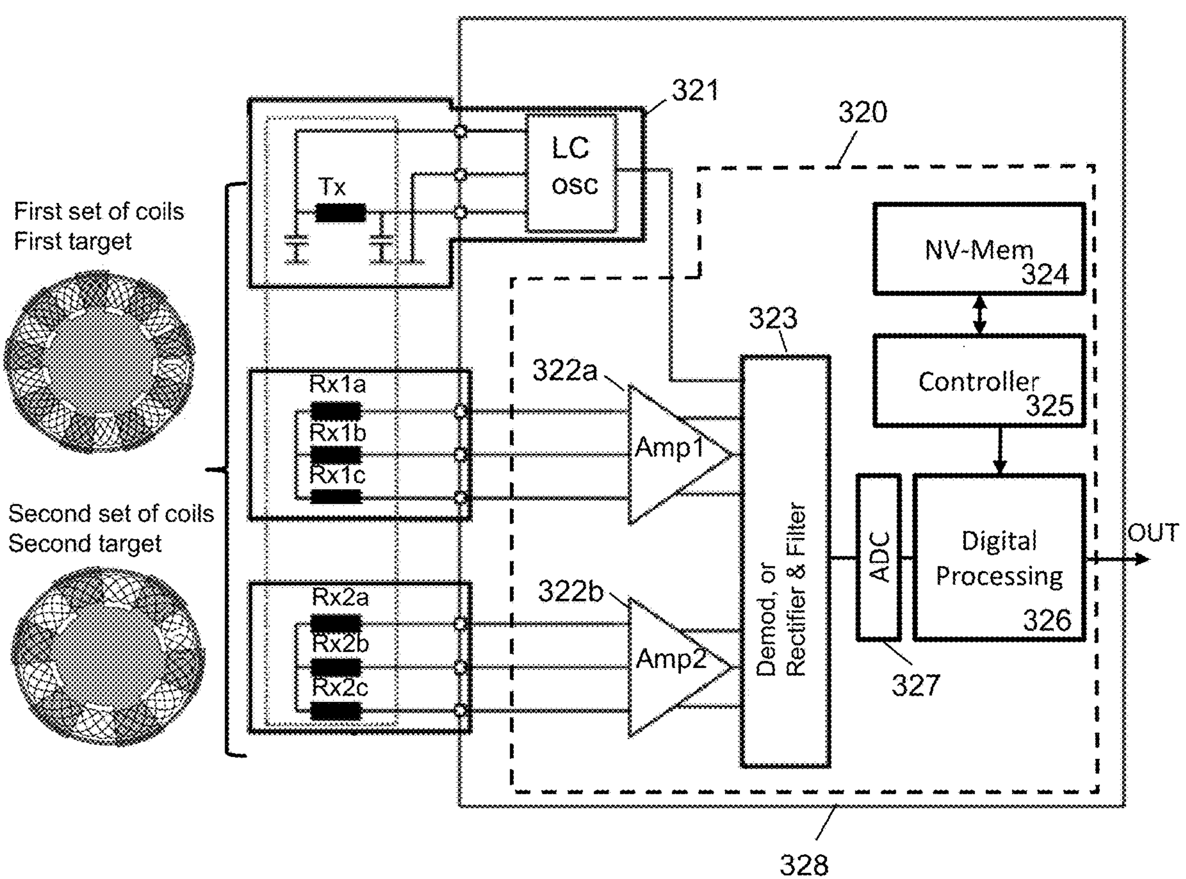
FIG. 3 shows a high-level block diagram of an electronic circuit that may be used in embodiments of the present invention.

FIG. 1C shows an illustrative example of a printed circuit board PCB 110 comprising the plurality of coils (not explicitly shown in FIG. 1C, but see e.g. FIG. 2A and FIG. 2B). The PCB may also comprise the excitation circuit 321 and the evaluation circuit 320, preferably integrated in a single semiconductor device 128 (e.g. as illustrated in FIG. 3). The PCB is typically fixedly mounted to a frame (not shown).

FIG. 1D shows an illustrative example of a second coupling element having M lobes (in the example: M=6).

In the example shown in FIG. 1A to FIG. 1D, the first target 131 with periodicity N is located on the side of the output shaft 143, and the second target 132 with periodicity M is located on the side of the input shaft 142, but the present invention is not limited hereto, and it is of course also possible to connect the first target 131 to the input shaft 142 and to connect the second target 132 to the output shaft 143.

In the example of FIG. 1B, the PCB has a particular shape having a rectangular portion at the bottom and a semi-circular portion at the top, but the present invention is not limited hereto, and other shapes are also possible. The PCB may be a single six-layer PCB, where the first set of coils is implemented in the two layers located on the left of FIG. 1A, situated near the first target 131, and where the second set of coils is implemented in the two layers located on the right of FIG. 1A, situated near the second target 132, and where the two inner layers function as a shield for reducing cross-talk between the first target and the first set of coils on the one hand, and the second target and the second set of coils on the other hand.

FIG. 2A shows an illustrative example of the first coupling element 131, 231 of FIG. 1B, movably mounted relative to a transmitter coil Tx1 and a first set of receiver coils Rx1_a_, Rx1_b_, Rx1_c_. These coils may be implemented in a printed circuit board (e.g. as illustrated in FIG. 1C, but not explicitly shown in FIG. 2A). The receiver coils Rx1_a_, Rx1_b_, Rx1_c_ have the same periodicity N as the first coupling element 231. In the specific example shown in FIG. 2A the first periodicity N is equal to 9, but the present invention is not limited thereto, and other values of N are also possible (see e.g. FIG. 4B).

In the example shown in FIG. 2A, the first set of receiver coils comprises three receiver coils Rx1_a_, Rx1_b_, Rx1_c_, which are 120° spaced apart from each other. The signals obtained from these three receiver coils can be decoded using a three-phase system. But the present invention is not limited thereto, and it is also possible to use a first set of receiver coils having only two receiver coils (not shown) which are 90° spaced apart. The signals obtained from these two receiver coils can be decoded using a two-phase system. Two-phase systems and three-phase decoding systems are well known in the art, are not the main focus of the present invention, and hence need not be described in further detail here.

FIG. 2B shows an illustrative example of the second coupling element 132, 232 of FIG. 1D, movably mounted relative to a transmitter coil Tx2 and a second set of receiver coils Rx2_a_, Rx2_b_, Rx2_c_. These coils may be implemented in the same printed circuit board as the first set of receiver coils, or in another printed circuit board. The receiver coils Rx2_a_, Rx2_b_, Rx2_c_ have the same periodicity M as the second coupling element 232 (in the example M=6, but other values are also possible, see e.g. FIG. 4B).

In the example shown in FIG. 2B, the second set of receiver coils comprises three receiver coils which are 120° spaced apart from each other, forming a three-phase coil system, but the present invention is not limited thereto, and it is also possible to use a second set of receiver coils having only two receiver coils (not shown) which are 90° spaced apart.

In an embodiment, the first set of receiver coils contains two coils which are 90° phase shifted relative to each other, and the second set of receiver coils also contains two coils which are 90° phase shifted relative to each other.

In an embodiment, the first set of receiver coils contains two coils which are 90° phase shifted relative to each other, and the second set of receiver coils contains three coils which are 120° phase shifted relative to each other.

In an embodiment, the first set of receiver coils contains three coils which are 120° phase shifted relative to each other, and the second set of receiver coils contains two coils which are 90° phase shifted relative to each other.

In an embodiment, the first set of receiver coils contains three coils which are 120° phase shifted relative to each other, and the second set of receiver coils also contains three coils which are 120° phase shifted relative to each other.

A reader unfamiliar with the layout of coils may refer to EP3885711(A1), which document is incorporated herein by reference in its entirety, but the present invention is not limited thereto, and other coil layouts can also be used.

FIG. 3 shows a high-level block diagram of an electronic circuit that may be used in embodiments of the present invention, but the present invention is not limited hereto, and other circuits may also be used.

The electronic circuit of FIG. 3 comprises two main sub-circuits: an excitation circuit 321 and an evaluation circuit 320. In the example of FIG. 3, these sub-circuits are implemented in a single integrated semiconductor device 328, but that is not absolutely required, and the excitation may also be performed by a separate circuit, e.g. by a separate chip.

The electronic circuit of FIG. 3 is connected to the at least one transmitter coil (schematically illustrated by a single black rectangle Tx), but as explained above, it is also possible to use two discrete transmitter coils Tx1, Tx2. In that case, the two transmitter coils are preferably driven by a single excitation signal, e.g. by connecting them in series or in parallel. The transmitter coil TX may be part of the excitation circuit 321, but that is not absolutely required. The transmitter coil Tx may be excited at a frequency of about 1 MHz to about 20 MHz. The excitation frequency may be higher than, or lower than, or substantially equal to the resonance frequency of the oscillator circuit. These aspects are well known in the art but are not the main focus of the present invention, and hence need not be explained in more detail here.

The electronic circuit of FIG. 3 is also connected to the first set of receiver coils (schematically illustrated by three black rectangles Rx1*a*, Rx1*b*, Rx1*c*), and to the second set of receiver coils (schematically illustrated by three black rectangles Rx2*a*, Rx2*b*, Rx2*c*). The circuit 328 is configured for receiving signals from each set of receiver coils, and optionally for amplifying these signals using amplifier 322*a*, 322*b*, and for decoding the received signals in known manners, for example by demodulating the received signals into baseband signals. The demodulation may comprise synchronous rectification and low-pass filtering 323. The demodulated signals may be further processed using analog or digital circuitry, comprising for example an analog-to-digital convertor 327, a digital processor 326 (e.g. a DSP), a controller 325, connected to a non-volatile memory 324 (e.g. flash).

The evaluation circuit 320 may be configured for determining a first mechanical angle value α1 based on the signals obtained from the first set of receiver coils and the first periodicity N (e.g. by determining a first electrical angle based on the received signals, and dividing this electrical angle by the first periodicity N), and for determining a second mechanical angle value α2 based on the signals obtained from the second set of receiver coils and the second periodicity M (e.g. by determining a second electrical angle based on the received signals, and dividing this electrical angle by the second periodicity M). A relative position between the two targets can be calculated based on a difference between the values α1 and α2. This relative position is indicative for (e.g. proportional to) a torque exerted upon the torsion bar 141. The angular difference and/or the torque value may be calculated inside the evaluation circuit 320 and output to an external processor, e.g. to an electronic control unit (ECU, not shown) connected to the circuit 328. Alternatively or additionally, the angles α1 and α2 may be output, and the angular difference and/or torque may be calculated by said external processor.

It is noted that the architecture of the electronic circuit shown in FIG. 3 is only an example of how the signals obtained from the receiver coils may be processed to obtain to angle values, but the present invention is not limited hereto, and other architectures may also be used.

Figures 4A, 4B:
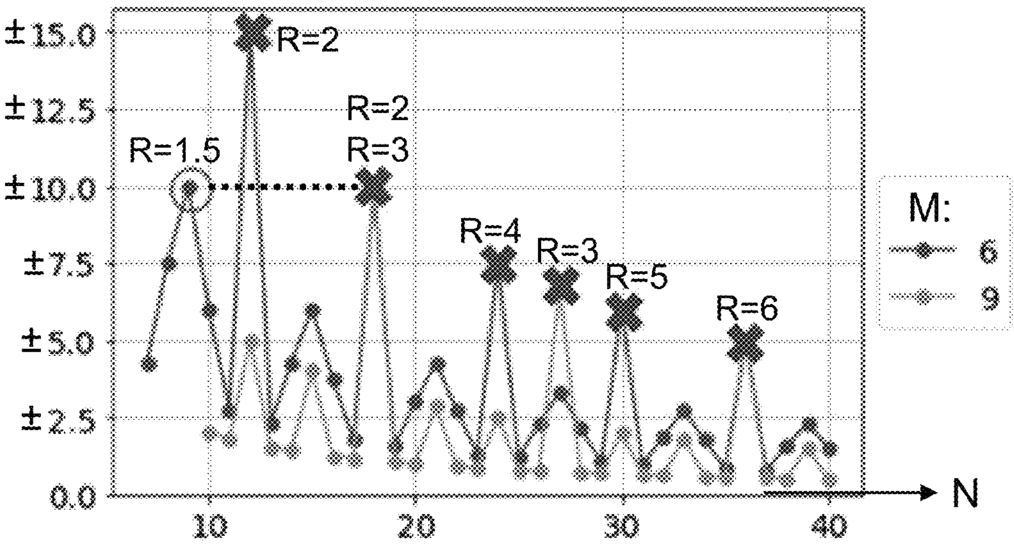
FIG. 4A shows a graph illustrating that an inductive angle sensor with (N=9, M=6) has the same measurement range as an inductive angle sensor with (N=18, M=9), namely 20° or ±10°.
FIG. 4B shows the angular range for five illustrative combinations of N and M, as may be used in embodiments of the present invention.

FIG. 4A shows a graph, not known from the prior art but presented by the present invention, illustrating the measurement range for several combinations of the first periodicity N and the second periodicity M. The inventors found that the measurement range of an inductive angle sensor having a structure like that shown in FIG. 1A with a first periodicity N and a second periodicity M can be expressed by the following formula:

$$\text{Measurement range} = 360°/LCM(N, M) \quad [1]$$

where LCM is the Least Common Multiple of the values N and M.

More specifically, FIG. 4A shows two "curves":

- an upper curve (in black) shows the measurement range as a function of the first periodicity N for a fixed value of the second periodicity M equal to 6. As can be seen, this curve provides multiple relatively high peaks (indicated by an "X"), namely for N=12 (which is 2*6), and for N=18 (which is 3*6), and for N=24 (which is 4*6), etc.
- a lower curve (in gray) shows the measurement range as a function of the first periodicity N for a fixed value of the second periodicity M equal to 9. As can be seen, this curve also provides several relatively high peaks, namely for N=18 (which is 2*9), and for N=27 (which is 3*9), etc.

The inventors surprisingly found that the upper curve shows an additional peak for N=9 and M=6, for which the ratio N/M is 1.5. As can be appreciated from FIG. 4A, the range of +10° obtainable by an inductive angle sensor with (N=9, M=6, ratio=1.5), as proposed by the present invention, and indicated by a circle, is the same measurement range as a classical inductive angle sensor with (N=18, M=9, ratio=2) and as a classical inductive angle sensor with (N=18, M=6, ratio=3).

This observation illustrates a first insight of the present invention but does not provide a clue about the accuracy or error obtained by such an inductive angle system.

Before describing the accuracy or error, FIG. 4B provides a table listing the angular range for five illustrative combinations of N and M, as may be used in embodiments of the present invention. It can be appreciated that i) the combination of (N=6, M=4, ratio=1.5) as proposed by the present invention provides the same range (namely ±15°) as can be obtained by the classical sensor with (N=12, M=6, ratio=2), and ii) the combination of (N=9, M=6, ratio=1.5) as proposed by the present invention provides the same range (namely ±10°) as can be obtained by the classical sensor with (N=18, M=9, ratio=2), and iii) the combination of (N=12, M=8, ratio=1.5) as proposed by the present invention provides the same range (namely ±7.5°) as can be obtained by the classical sensor with (N=24, M=6, ratio=4), etc.

From these examples, it can be seen that a same range can be achieved using smaller periodicities with ratio N/M=1.5 as compared to prior art solutions that use an integer ratio N/M=2 or higher. For inductive angle sensors of comparable dimensions, this means stronger signals, lower noise and lower sensitivity to misalignment, while only slightly lowering the resolution.

It is noted that the measurement range may depend on the application. For example, for measurement of the torque of a steering wheel in automotive applications, a measurement range of at least 10°, or at least 15° or at least 20° may be required. A smaller measurement range may be applicable in other fields, e.g. in certain robotic and/or industrial applications. It is noted in this respect that the list of FIG. 4B is not exhaustive, and that further combinations of N and M, where N and M are integer values having a ratio of 1.5 can readily be found.

But an important second insight underlying the present invention is to understand and be able to quantify the error (or accuracy) for an inductive angle sensor of the type as illustrated in FIG. 1A, having various values of the first periodicity N and the second periodicity M, e.g. as listed in FIG. 4B.

Existing solutions seem to choose values of N and M in order to maximize the resolution of the sensor for a given measurement range. A typical measurement range for automotive applications is ±10°. While a "high resolution" is important, other factors which are also important for a good performance of an inductive angle sensor are noise and cross-talk. Each of these factors will be explained in more detail next.

i) First Factor: Range and Resolution

The first set of receiver coils and the first movable element have a first periodicity N. The second set of receiver coils and the second movable element has a second periodicity M. As mentioned above, the measurement range is 360° divided by the least common multiple of N and M.

The resolution of the differential angle is determined by the resolution of the smaller of the values N and M, thus by M. The resolution is typically defined as the mechanical angle corresponding to 1 LSB (least significant bit). For a given evaluation circuit (e.g. having an ADC with a predefined number of bits, e.g. 12 bits), the higher the periodicity, the higher the resolution. More specifically, when using a 12 bit ADC, the lowest number can represent 0, the highest number can represent 4095, and the resolution can be defined as (360/M)/4096 when expressed in mechanical degrees, or in general: resolution=(360°/M) divided by power(2,K), where K=12 for a 12-bit ADC.

When comparing an inductive angle sensor of the present invention with (N=9, M=6, ratio=1.5, range=±10° with the classical inductive angle sensor with (N=18, M=9, ratio=2, range=)±10°, the resolution of the sensor proposed by the present invention is only a factor of 1.5 times lower.

ii) Second Factor: Noise and Signal Strength

Inductive sensors with high periodicities (i.e. large N or M) have an important drawback: As the periodicity increases, the signal strength of the signals provided by the receiver coils gets weaker, because the target lobes (or teeth) become smaller and are excited less efficiently, causing the noise level to increase (i.e. the signal-to-noise ratio, SNR, to decrease).

Figure 5:
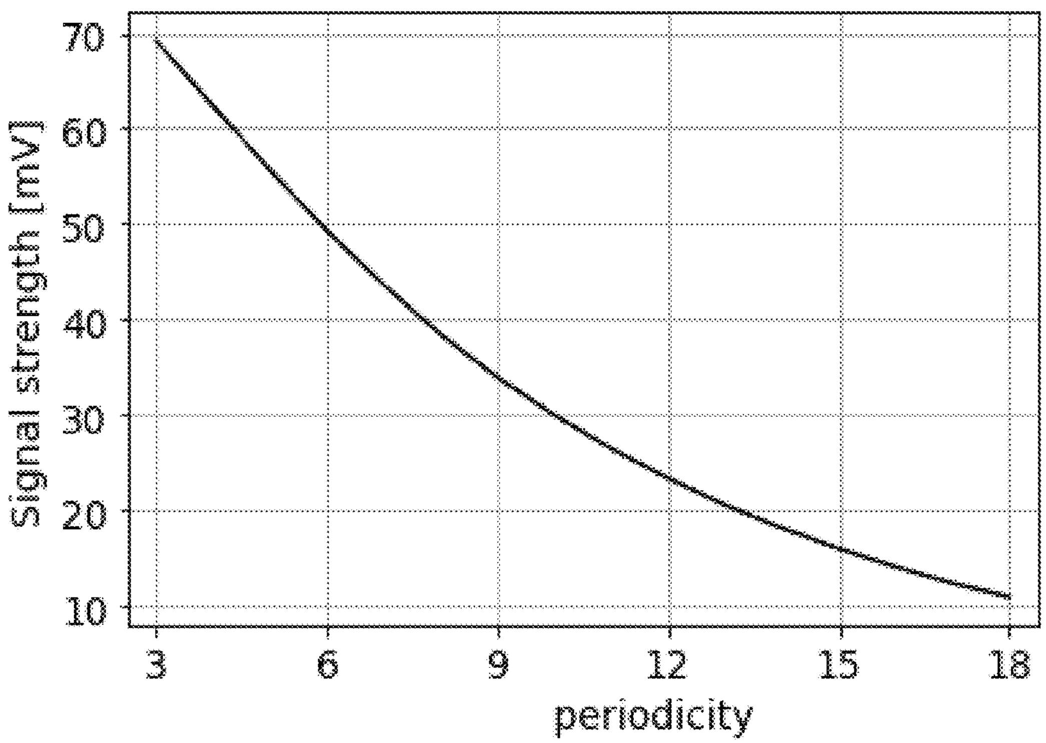
FIG. 5 shows a graph with a typical signal strength of the signals obtained from the receiver coils as a function of the periodicity.

This is illustrated in FIG. 5, showing a graph with a typical signal strength as a function of the periodicity. As can be seen, the larger the periodicity, the smaller the signal strength. The signal strength of an inductive sensor is highly dependent on its periodicity (read: N and M) and dimensions (e.g. radius). For a given dimension (e.g. radius), the signal strength is reduced as the periodicity is increased.

Figure 6:
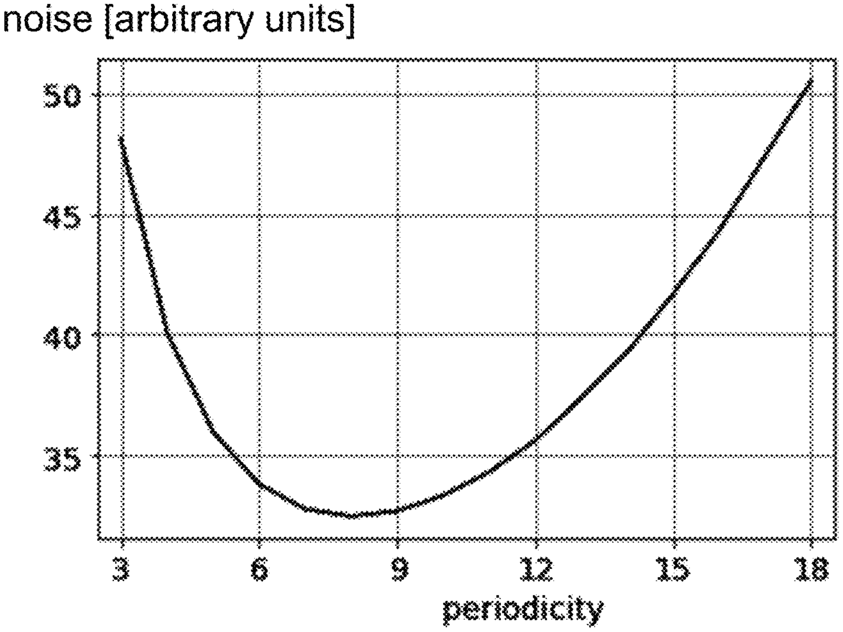
FIG. 6 shows a curve showing a typical amount of noise (in arbitrary units) as a function of the periodicity (or number of lobes) of the coupling element and the receiver coils.

FIG. 6 shows an illustrative curve showing a typical amount of noise (in arbitrary units) as a function of the periodicity (e.g. the number of lobes) of the coupling element and the receiver coils, mounted at a predefined distance from the receiver coils, as can be obtained from measurements or computer simulations.

Noise is inversely proportional to the signal strength. Therefore, the noise performance of a sensor can be improved by increasing the signal level. It is noted that "noise expressed in electrical degrees" is obtained as 1/signal_strength. In order to obtain "noise expressed in mechanical degrees", the "noise in electrical degrees" needs to be divided by the periodicity.

The example of FIG. 6 was obtained by computer simulations modelling the signal strength of an inductive angle sensor as illustrated in FIG. 1A having a diameter of the target coil of 5.0 cm, arranged at an airgap "g" of 2.0 mm from a printed circuit board 110.

When comparing an inductive angle sensor of the present invention with (N=9, M=6, ratio=1.5, range=±10° with the classical inductive angle sensor with (N=18, M=9, ratio=2, range=)±10°, the noise of the former is typically about 29% lower than the latter, because, as can be appreciated from FIG. 6, noise related to N=9 is approximately 32, noise related to M=6 is approximately 34, thus total noise for (N=9 and M=6) is proportional to sqrt(32^2+34^2)≈46.7 for a sensor proposed by the present invention; noise related to N=18 is approximately 51, noise related to M=9 is approximately 32, thus total noise for a classical sensor with (N=18 and M=9) is proportional to sqrt(51^2+32^2)≈60.2. Thus the noise of the sensor with N=9 and M=6 as proposed by the present invention is about 29% lower than the noise of a classical sensor having the same angular range (with N=18 and M=9). While this is only an example for N=9 and M=6, the same or similar principles also apply for sensors of the present invention having periodicities other than N=9 and M=6.

iii) Third Factor: Cross-Talk

Ideally, the first angle value (e.g. of the input shaft) is independent from the second angle value (e.g. of the output shaft), and vice versa, but in practice, in order to obtain an independent measurement with a single printed circuit board, shielding layers between the first and the second set of coils may be required in order to avoid cross-talk, meaning that such a printed circuit board 110 (see FIG. 1C) needs to have at least six layers: two layers for the first set of receiver coils, two shielding layers, and two layers for the second set of receiver coils.

An inductive target having a periodicity N, even when being excited by a perfect sine wave, generates an alternating magnetic field containing a base frequency and harmonics of order N, 2N, 3N, 4N, 5N, 6N, 7N, etc., due to the spatial modulation e.g. related to the periodicities and/or the geometry of the receiver coils and/or the movable targets. It was surprisingly found that inductive angle sensors as proposed by the present invention, having an N/M ratio equal to 1.5, are particularly advantageous in terms of cross-talk.

Indeed, the inventors surprisingly found that a two-phase coil system (where the two input signals have substantially the same amplitude, but are 90° phase shifted) is sensitive to odd numbered harmonics, i.e. to harmonics of order N, 3N, 5N, 7N, 9N, etc, but that a three-phase coil system (where the three input signals have substantially the same amplitude, but are 120° phase shifted) are sensitive to harmonics N, 5N, 7N, 11N, 13N, etc. but not to 3N, 9N, and other multiples of 3N.

When the second coil set (having periodicity M) transmits a signal with base frequency, it is "seen" by the first coil set (having periodicity N=1.5*M) as a signal with frequency 1.5 times the base frequency, but is not sensitive to this;

- when the second coil set transmits a second harmonic (2M), it is seen by the first coil set as (3N), but if the first coil set is a three-phase system, it is insensitive to this frequency;
- when the second coil set transmits a third harmonic (3M), it is seen by the first coil set as (4.5N), but is insensitive to this frequency;
- when the second coil set transmits a fourth harmonic (4M), it is seen by the first coil set as (6N), but is insensitive to this frequency;
- when the second coil set transmits a fifth harmonic (5M), it is seen by the first coil set as (7.5N), but is insensitive to this frequency;
- when the second coil set transmits a sixth harmonic (6M), it is seen by the first coil set as (9N), but if the first coil set is a three-phase system, it is insensitive to this frequency, etc.

Thus, in an inductive angle sensor of the present invention, with N/M=1.5, the first coil set (having periodicity N) does not experience cross-talk from signals emitted by the second coil set (having periodicity M), if the first coil set is a three-phase system. Or stated in other words, the second coil set (with periodicity M) does not disturb the signals of the first coil set (with periodicity N). In fact, simulations have shown that the cross-talk for an inductive angle sensor with N/M=1.5 is not only negligible for a three-phase system, but also for a two-phase system.

Following a similar reasoning, it can be shown that also the second coil set (having periodicity M) does not suffer cross-talk from signals emitted by the first coil set (having periodicity N). Indeed,

- when the first coil set (having periodicity N) transmits a signal with base frequency, it is "seen" by the second coil set (having periodicity M=N/1.5) as a signal with frequency 0.67 times the base frequency, but is insensitive to this frequency;
- when the first coil set transmits a second harmonic (2N), it is seen by the second coil set as (1.33*M), but is insensitive to this frequency;
- when the first coil set transmits a third harmonic (3N), it is seen by the second coil set as (2M), but is insensitive to this frequency;
- when the first coil set transmits a fourth harmonic (4N), it is seen by the second coil set as (2.66*M), but is insensitive to this frequency;
- when the first coil set transmits a fifth harmonic (5N), it is seen by the second coil set as (3.33*M), but is insensitive to this frequency;
- when the first coil set transmits a sixth harmonic (6N), it is seen by the second coil set as (4*M), but is insensitive to this frequency, etc.

Thus, in an inductive angle sensor of the present invention, with N/M=1.5, the second coil set (having periodicity M) does not experience cross-talk from signals emitted by the first coil set (having periodicity N), irrespective of whether the second coil set is implemented with a two-phase or a three-phase system. Or stated in other words, the first coil set (with periodicity N) does not disturb the signals of the second coil set (with periodicity M).

This is true even if the first and second set of receiver coils are implemented on a four-layer printed circuit board without two shielding layers, which is less complicated to produce than a six-layer PCB, and is therefore much cheaper.

The mutual independence of the first and second set of coils was explored quantitatively via simulations. A model without shielding layers was used with N=9, M=6, ratio=1.5, Tx coil diameter: 38 mm, Rx coils outer diameter: 34 mm, Rx coils inner diameter: 22 mm, Target outer diameter: 40 mm, Target inner diameter: 20 mm, air-gap between first target and first set of receiver coils: 2.0 mm, air-gap between second target and second set of receiver coils: 2.0 mm, thickness of PCB: 1.0 mm, air-gap between first target and second set of receiver coils: 3.0 mm, air-gap between second target and first set of receiver coils: 3.0 mm, e.g. as depicted in FIG. 1A, assuming a PCB thickness of 1.0 mm.

The following results were found for an inductive angle sensor of the present invention with N=9 and M=6: the first movable target (with N=9) generated signals in the first receiver coils of 10 mV, the second movable target (with M=6) generated signals in the second receiver coils of 20 mV, the first target (with N=9) generated signals of less than 10 μV in the second set of coils (with M=6), the second target (with M=6) generated signals of less than 10 μV in the first set of coils (with N=6), resulting in errors of the differential angle of less than 0.01°.

These simulations were also performed for model of a classical inductive angle sensor with N=18 and M=9, ratio=2, having the same dimensions (d=5 cm, g=3 mm) and without shielding layers. In this case, the second target (with M=9) generated a signal of 0.2 mV in the first set of coils (with N=18), resulting in errors of the differential angle larger than 0.1°.

In summary, it can be concluded that an inductive angle sensor as described above, with a first periodicity N and a second periodicity M, where N/M=1.5, is a valid alternative for a classical inductive angle sensor with a first periodicity N and a second periodicity M, where N/M is an integer value.

When comprising a six-layer PCB containing two shielding layers, the proposed solution (with N/M=1.5) has a similar range, a slightly lower resolution (typically factor 1.5), and a slightly lower noise (typically factor 1.29) because of the smaller periodicity values, and no significant cross-talk. Overall, this means a slightly better accuracy as compared to a classical solution that is also implemented in a six-layer PCB containing two shielding layers and having the same range and same dimensions.

When comprising a four-layer PCB without two shielding layers, the proposed solution (with N/M=1.5) has a similar range, a slightly lower resolution (typically factor 1.5), a slightly lower noise (typically factor 2.5) because of the smaller periodicity values, but a much lower cross-talk. Overall, this means a much better accuracy as compared to a classical solution that is also implemented in a four-layer PCB without shielding layers and having the same range and same dimensions.

While the above-mentioned description was mainly provided for an inductive angle sensor with N=9 and M=6, the same reasoning is also applicable for other inductive angle sensors where N/M=1.5, e.g. having values for N and M as illustrated in FIG. 4B.

While an example with a 12 bit ADC was used, the present invention is not limited thereto, and other ADC's may also be used, e.g. with 14 bits or 16 bits.

The invention claimed is:

1. An inductive angle sensor, comprising:

at least one transmitter coil for generating an alternating magnetic field;

at least one excitation circuit for generating an alternating signal for energizing said at least one transmitter coil;

a first set of receiver coils, each having a geometry with a first periodicity N;

a second set of receiver coils, each having a geometry with a second periodicity M smaller than the first periodicity N;

an evaluation circuit for evaluating signals obtained from the first and second set of receiver coils;

a first movable coupling element for providing an inductive coupling between the at least one transmitter coil and the first set of receiver coils, the first movable coupling element having a periodic geometry with said first periodicity N;

a second movable coupling element for providing an inductive coupling between the at least one transmitter coil and the second set of receiver coils, the second movable coupling element having a periodic geometry with said second periodicity M;

wherein a ratio of the first periodicity N and the second periodicity M is equal to 1.5; and the first and the second periodicity N, M is one of the following combinations:

i) the first periodicity N is equal to 6 and the second periodicity M is equal to 4; or ii) the first periodicity N is equal to 9 and the second periodicity M is equal to 6; or iii) the first periodicity N is equal to 12 and the second periodicity M is equal to 8; or iv) the first periodicity N is equal to 15 and the second periodicity M is equal to 10; or v) the first periodicity N is equal to 18 and the second periodicity M is equal to 12.

2. The inductive angle sensor according to claim 1, wherein the evaluation circuit is configured for determining a first angular value based on the signals obtained from the first set of receiver coils and the first periodicity N, and for determining a second angular value based on the signals obtained from the second set of receiver coils and the second periodicity M, and for determining a difference between the first angular value and the second angular value.

3. The inductive angle sensor according to claim 1, wherein the first set of receiver coils has a two-phase loop structure, and wherein the second set of receiver coils has a two-phase loop structure; or wherein the first set of receiver coils has a two-phase loop structure, and wherein the second set of receiver coils has a three-phase loop structure; or wherein the first set of receiver coils has a three-phase loop structure, and wherein the second set of receiver coils has a two-phase loop structure; or wherein the first set of receiver coils has a three-phase loop structure, and wherein the second set of receiver coils has a three-phase loop structure.

4. The inductive angle sensor according to claim 1, wherein at least one of the first and second set of receiver coils has a three-phase loop structure; and wherein the at least one transmitter coil and the first set of receiver coils and the second set of receiver coils are implemented on a single multi-layer printed circuit board.

5. The inductive angle sensor according to claim 4, wherein the printed circuit board is a four-layer printed circuit board.

6. An inductive torque sensor comprising:

a torsion bar; and an inductive angle sensor according to claim 1;

wherein the first movable coupling element and the second movable coupling element are connected to the torsion bar.

7. A printed circuit board comprising:

at least one transmitter coil for generating an alternating magnetic field;

a first set of receiver coils, each having a geometry with a first periodicity (N);

a second set of receiver coils, each having a geometry with a second periodicity M smaller than the first periodicity N;

wherein the printed circuit board comprises only four layers;

a ratio of the first periodicity N and the second periodicity M is equal to 1.5;

and the first and the second periodicity N, M is one of the following combinations:

i) the first periodicity N is equal to 6 and the second periodicity M is equal to 4; or ii) the first periodicity N is equal to 9 and the second periodicity M is equal to 6; or iii) the first periodicity N is equal to 12 and the second periodicity M is equal to 8; or iv) the first periodicity N is equal to 15 and the second periodicity M is equal to 10; or v) the first periodicity N is equal to 18 and the second periodicity M is equal to 12.

8. The printed circuit board according to claim 7, further comprising:

at least one excitation circuit for generating an alternating signal for energizing said at least one transmitter coil;

an evaluation circuit for evaluating signals obtained from the first and second set of receiver coils.

9. The printed circuit board according to claim 8, wherein the at least one excitation circuit and the evaluation circuit are implemented in a single integrated circuit device, mounted on the printed circuit board.

* * * * *